United States Patent
Zhang et al.

(10) Patent No.: US 12,145,131 B2
(45) Date of Patent: Nov. 19, 2024

(54) POLYMERIC LANTHANUM NANOCOMPOSITE, AND PREPARATION METHOD AND APPLICATION THEREOF

(71) Applicant: NANJING UNIVERSITY, Nanjing (CN)

(72) Inventors: Yanyang Zhang, Nanjing (CN); Bo Kong, Nanjing (CN); Bingcai Pan, Nanjing (CN); Xiang Gao, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 607 days.

(21) Appl. No.: 17/609,304

(22) PCT Filed: Sep. 9, 2020

(86) PCT No.: PCT/CN2020/114187
§ 371 (c)(1),
(2) Date: Nov. 5, 2021

(87) PCT Pub. No.: WO2021/047536
PCT Pub. Date: Mar. 18, 2021

(65) Prior Publication Data
US 2022/0219142 A1    Jul. 14, 2022

(30) Foreign Application Priority Data
Sep. 12, 2019   (CN) .......................... 201910861894.6

(51) Int. Cl.
*B01J 20/30*       (2006.01)
*B01J 20/26*       (2006.01)
(Continued)

(52) U.S. Cl.
CPC ........... *B01J 20/305* (2013.01); *B01J 20/265* (2013.01); *B01J 20/28007* (2013.01);
(Continued)

(58) Field of Classification Search
CPC ................ B01J 20/265; B01J 20/28007; B01J 20/28019; B01J 20/305; B01J 20/3475;
(Continued)

(56) References Cited

FOREIGN PATENT DOCUMENTS

| CN | 104138750 A | 11/2014 |
|----|-------------|---------|
| CN | 105214629 A | 1/2016  |

(Continued)

OTHER PUBLICATIONS

Yanyang Zhang "Performance and Mechanism of Phosphorus Removal and Recovery by Polymeric Nanocomposites", Department of Environmental Engineering, School of the Environment, Nanjing University, May 2016, pp. 1-127, Nanjing, P.R. China.
(Continued)

*Primary Examiner* — Brian A McCaig

(57) ABSTRACT

The present invention discloses a polymeric lanthanum nanocomposite, and a preparation method and application thereof and relates to the field of environmental functional materials. The preparation method includes the following steps: (1) mixing lanthanum chloride heptahydrate with concentrated hydrochloric acid and dissolving the mixture in alcohol, adding a resin polymer, and stirring at room temperature; (2) draining the resin after the stirring for use; (3) adding the resin to a precipitant solution, and stirring at room temperature and then filtering out the resin; and (4) washing the resin with water until the resin is neutral, adding a NaCl solution, stirring and then filtering out the resin, and drying to obtain the polymeric lanthanum nanocomposite. The prepared polymeric lanthanum nanocomposites have a relatively more uniform distribution, and show a higher phosphorus adsorption rate.

12 Claims, 5 Drawing Sheets

(51) Int. Cl.
*B01J 20/28* (2006.01)
*B82Y 30/00* (2011.01)
*B82Y 40/00* (2011.01)
*C02F 1/28* (2023.01)
*C02F 101/10* (2006.01)

(52) U.S. Cl.
CPC ......... *B01J 20/28019* (2013.01); *B82Y 30/00* (2013.01); *B82Y 40/00* (2013.01); *C02F 1/285* (2013.01); *C02F 2101/105* (2013.01)

(58) Field of Classification Search
CPC ......... B82Y 30/00; B82Y 40/00; C02F 1/285; C02F 1/288; C02F 1/42; C02F 1/66; C02F 2101/105; C02F 2303/16; C02F 2305/08
See application file for complete search history.

(56) References Cited

FOREIGN PATENT DOCUMENTS

| | | |
|---|---|---|
| CN | 110026161 A | 7/2019 |
| CN | 110026169 A | 7/2019 |
| CN | 110681368 A | 1/2020 |

OTHER PUBLICATIONS

Malcolm Robb et al. "Application of Phoslock, an innovative phosphorus binding clay, to two Western Australian waterways: preliminary findings", Hydrobiologia 494, Mar. 2003, pp. 237-243.

Ling Zhang et al., "Phosphate adsorption on lanthanum hydroxide-doped activated carbon fiber", Chemical Engineering Journal, Jan. 11, 2012, pp. 160-167.

Md. Rabiul Awual et al., "Removal of trace arsenic(V) and phosphate from water by a highly selective ligand exchange adsorbent", Journal of Environmental Sciences, Dec. 2011, pp. 1947-1954, vol. 23, Issue 12.

POLYMERIC LANTHANUM NANOCOMPOSITE, AND PREPARATION METHOD AND APPLICATION THEREOF

TECHNICAL FIELD

The present invention relates to the field of environmental functional materials, and in particular, to a polymeric lanthanum nanocomposite, and a preparation method and application thereof.

BACKGROUND

As a rare earth element, lanthanum is highly abundant in soil and environmentally friendly. As strategic resources, rare earth minerals are rich in China, laying a solid foundation for industrial application. As lanthanum has a large coordination number, lanthanum has a strong capability of coordination with many inorganic ligands, and especially has a strong affinity for phosphate; and even at trace levels, it still shows a capability of efficiently removing phosphate. The specific adsorption of phosphorus by lanthanum can generate lanthanum-phosphate complexes. $pK_{sp}$ of lanthanum phosphate in an aqueous solution is 26.15, which is much lower than those of other metal phosphates. At present, there have been many reports on the preparation of lanthanum-loaded or modified materials. For example, *Application of Phoslock™, an innovative phosphorus binding clay, to two Western Australian waterways: preliminary findings* published in Vol. 494, *Hydrobiologia* 2003 disclosed Phoslock developed by Australian CISRO, which is a kind of lanthanum modified bentonite, but is difficult to recover or recycle, and has a potential risk of lanthanum dissolving out. *Removal of phosphate from water by a highly selective La(II)-chelex resin* published in vol. 69, *Chemosphere* 2007 disclosed a chelex-100 resin loaded with lanthanum, which has a high lanthanum loading amount but has a low utilization rate and small adsorption capacity, and it also dissolves out more lanthanum under long-term exposure conditions. *Phosphate adsorption on lanthanum hydroxide-doped activated carbon fiber* published in Issue 185-186, *Chemical Engineering Journal* 2012 disclosed synthesized fiber activated carbon ACF-LaOH loaded with lanthanum, which has a limited loading amount and adsorption capacity, and is difficult to recycle.

This research group has been committed to the synthesis of nano-lanthanum composites and application thereof in phosphorus adsorption for many years. For example, the Nanjing University graduation thesis *Basic research on the application of advanced phosphorus removal and phosphorus recovery from sewage based on nanocomposites* disclosed a D201-based nano-sized hydrated-lanthanum oxide material and a preparation method thereof and application thereof in P adsorption, where a process for preparing La-201 includes: dissolving 20 g LaCl$_3$ in 150 mL of aqueous solution containing 20% (v/v) ethanol, and adjusting the pH to 3-7, to ensure that La mainly exists in the form of La$^{3+}$ and LaCl$^{2+}$; adding 20 g of D-201 to the solution, stirring evenly at 50° C. for 12 h, and stirring at 60° C. for 6 h to fully concentrate the La solution; filtering out the immersed and concentrated D-201, gradually adding the D-201 to 15% NaOH solution, and continuously stirring for 12 h; finally performing heat treatment on the solution containing the D-201 in a 60° C. water bath to ensure that the loaded La is completely converted into crystalline hydrated lanthanum oxide (HLO); rinsing the obtained material with deionized water until the effluent is neutral, and using 5% NaCl solution to convert remaining OH$^-$ into Cl$^-$; then rinsing with deionized water and 100 mL of ethanol, and drying in an oven at 50° C. for 12 h to obtain the nanocomposite La-201.

For another example, Chinese patent No. CN 201910290333.5 of this research group filed on Apr. 11, 2019 describes a method for preparing a polymer-based nano-sized hydrated-lanthanum oxide material, including the following implementation steps: (1) dissolving 10 g of lanthanum chloride heptahydrate in a mixture of 50 mL of ethanol and 100 mL of ultrapure water, adding 10 g of chloromethylstyrene-divinylbenzene copolymer spheres, and stirring and concentrating at 50° C. until the solution just immerses the copolymer spheres to obtain a product a; (2) drying the product a at 60° C. until the solution is nearly dry, to obtain a product b; (3) under stirring conditions, adding the product b to 5% NaOH solution at a mass ratio of 1:300 each time (i.e., adding the product b to 150 g of NaOH solution with an adding amount of 0.5 g each time), with the time interval for each addition being 10 s, until the adding of the product b is completed, and then stirring at room temperature for 12 h in a closed environment; (4) stirring for 8 h at 5° C. in a closed environment, and filtering to obtain a product c; (5) washing the product c with water until it is neutral, adding the product c to 400 mL of 5% NaCl solution, stirring at room temperature, repeating the operation many times, until the pH of the supernatant of the NaCl solution is within the range of 6.5 to 7.5, and filtering to obtain a product d; (6) adding 200 mL of 20% ethanol water to the product d and stirring for 0.5 h, removing excessive liquid, and drying at 50° C. to obtain the polymer-based nano-sized hydrated-lanthanum oxide material.

In the above-mentioned studies, a concentration difference between the inside and outside of polymer pores is used to make lanthanum ions (lanthanum exists mainly in the form of La$^{3+}$ and LaCl$^{2+}$ (including [La(H$_2$O)$_8$]$^{3+}$, [La(H$_2$O)$_7$Cl]$^{2+}$, etc.)) repelled by the polymer pores enter the pores to load the lanthanum ions so as to prepare nano-lanthanum composites. The loading rate and uniformity of lanthanum in the obtained composites and the stability of the formed composites need to be improved.

SUMMARY

1. To-be-Resolved Problem

In view of the problems of poor uniformity and stability of the nano-lanthanum composites obtained through loading by using an existing concentration difference method, the present invention provides a polymeric lanthanum nanocomposite, and a preparation method and application thereof, where in the method, an anion exchange resin and lanthanum are combined in an ion exchange manner, and then the nano-lanthanum composite is formed in situ, so that nano-lanthanum particles are distributed more uniformly, and the stability of the formed composite is improved.

2. Technical Solutions

To solve the above-mentioned problems, the technical solutions adopted by the present invention are as follows:

A method for preparing a polymeric lanthanum nanocomposite includes the following steps:

(1) mixing lanthanum chloride heptahydrate with concentrated hydrochloric acid and dissolving the mixture in alcohol, adding a resin, and stirring at room temperature;

(2) draining the resin after the stirring for use;

(3) adding the resin obtained in step (2) to a precipitant solution, and stirring at room temperature and then filtering out the resin; and (4) washing the resin obtained in step (3) with water until the resin is neutral, adding a NaCl solution, stirring and then filtering out the resin, and drying to obtain the polymeric lanthanum nanocomposite.

Preferably, in step (1), the concentrated hydrochloric acid solution has a concentration of 10-12 mol/L, and a concentration of the concentrated hydrochloric acid in the alcohol is 0.5-1.5 mol/L. The concentrated hydrochloric acid can increase the concentration of Cl⁻ in the solution, which is beneficial to the formation of complex anions between lanthanum and chlorine.

Preferably, in step (1), the alcohol is methanol or ethanol.

Preferably, in step (1), the stirring is performed for 5-24 h.

Preferably, in step (1), a resin polymer is strong base D-201 resin or gel 201 resin.

Preferably, in step (1), the lanthanum chloride heptahydrate has a concentration of 40-200 g/L, and a ratio of the mass of the D-201 resin to the mass of the lanthanum chloride heptahydrate is (0.5-2):1.

Preferably, in step (3), the precipitant is one or more selected from the group consisting of sodium hydroxide, sodium carbonate, sodium bicarbonate, ammonium carbonate or ammonium bicarbonate.

Preferably, in step (3), the precipitant is sodium hydroxide.

Preferably, in step (3), the precipitant is ammonium bicarbonate.

Preferably, in step (3), a mass concentration of the precipitant is 8%-15%.

Preferably, in step (3), the stirring is performed for 5-24 h.

Preferably, in step (4), a concentration of the sodium chloride is 2%-5%.

Preferably, in step (4), the stirring is performed for 4-8 h, and the drying is performed at 50° C.-60° C.

The present invention further provides a polymeric hydrated lanthanum oxide nanocomposite obtained by using the above-mentioned preparation method, where the precipitant is a hydroxide, the polymeric hydrated lanthanum oxide nanocomposite has a diameter of 0.3-1.0 mm, nano-sized hydrated-lanthanum oxide particles have a size of 10-100 nm, and a loading amount of lanthanum in the polymeric hydrated lanthanum oxide nanocomposite is 18%-22%.

The present invention further provides a polymeric hydrated lanthanum carbonate nanocomposite obtained by using the above-mentioned preparation method, where the precipitant is a carbonate or a bicarbonate, the polymeric hydrated lanthanum carbonate nanocomposite has a diameter of 0.3-1.0 mm, nano-sized lanthanum carbonate hydrate particles have a size of 20-120 nm, and a loading amount of lanthanum in the polymeric hydrated lanthanum carbonate nanocomposite is 11%-15%.

The present invention further provides application of the above-mentioned polymeric hydrated lanthanum oxide nanocomposite or polymeric hydrated lanthanum carbonate nanocomposite in removal of phosphate from water, including the following steps:

(A) adding the polymeric hydrated lanthanum oxide nanocomposite or the polymeric hydrated lanthanum carbonate nanocomposite into the water, with a solid-liquid ratio of 0.25-1 g/L, preferably 0.5 g/L, adjusting the pH in the range of 6-8, and reacting for 24 hours or more at room temperature under stirring or oscillation;

(B) taking supernatant to detect a phosphorus concentration after adsorption; and (C) washing the polymeric hydrated lanthanum oxide nanocomposite or the polymeric hydrated lanthanum carbonate nanocomposite with ultrapure water for 3-5 times after adsorption, and filtering and then drying the polymeric hydrated lanthanum oxide nanocomposite or the polymeric hydrated lanthanum carbonate nanocomposite at 50° C.-60° C.

Preferably, a regeneration method for the polymeric hydrated lanthanum oxide nanocomposite or polymeric hydrated lanthanum carbonate nanocomposite after phosphorus adsorption includes the following steps:

(i) adding the polymeric hydrated lanthanum oxide nanocomposite or the polymeric hydrated lanthanum carbonate nanocomposite into a mixed solution of 15% NaOH and 5% NaCl, with a solid-liquid ratio of 1-20 g/L, and reacting for 10-12 h under stirring or oscillation at 50° C.-70° C.;

(ii) taking supernatant to detect a phosphorus concentration after desorption; and (iii) washing the polymeric hydrated lanthanum oxide nanocomposite or the polymeric hydrated lanthanum carbonate nanocomposite with ultrapure water for 5-7 times after desorption, and filtering and then drying the polymeric hydrated lanthanum oxide nanocomposite or the polymeric hydrated lanthanum carbonate nanocomposite at 50° C.-60° C.

3. Beneficial Effects

Compared with the prior art, the present invention has the following beneficial effects:

(1) In the present invention, in view of the problems of uneven distribution and poor stability caused by lanthanum entering pores of the resin due to a concentration difference between the inside and outside of the resin in previous operation, an experimental plan is improved. Lanthanum and hydrochloric acid are mixed, so that the lanthanum and chloride ions form complex anions; in the alcohol, the lanthanum is uniformly adsorbed into pores of the anion exchange resin in this form, and then a nano-scale lanthanum compound is further generated in situ. It can be seen from the comparison between a material (FIG. 2a) prepared in Embodiment 1 and a material (FIG. 2b) prepared in Embodiment 4 according to a patent application No. CN 201910290333.5 in the prior art that, TEM shows that the nano-particle distribution of the polymeric lanthanum nanocomposite obtained by adopting the solution of the present invention is more uniform. It can be seen from the comparison of SEM-EDS line scan diagrams of FIG. 3a and FIG. 3b that, in the patent application No. CN 201910290333.5, the distribution of lanthanum nanoparticles is limited to an outer layer of the resin (FIG. 3b), and it is difficult to enter the resin. As a result, a large number of lanthanum nanoparticles are gathered in the outer ring of the resin, which is not conducive to the diffusion of pollutants and lowers the utilization efficiency of unit lanthanum. The lanthanum nanoparticles distribution in the solution of Embodiment 1 of the present invention is relatively more uniform (FIG. 3a), and lanthanum is distributed outside and inside, preventing possible clogging of the pores caused by external aggregation, and uniform diffusion increases active sites of lanthanum, which is conducive to adsorption. In the patent application No. CN 201910290333.5 of the prior art, due to the strong coordination between water molecules and lanthanum in an aqueous solution system (the coordination ability is stronger than that of Cl⁻), the lanthanum in the solution exists mainly in the form of $[La(H_2O)_8]^{3+}$, $[La(H_2O)_7Cl]^{2+}$ and the like. Although lanthanum enters the resin pores by using a concentration difference method, the distribution of lanthanum entering the pores in this form is often uneven; and in the alcohol solution system of the present invention, the impact of coordination of water molecules is reduced. Cl⁻ may be complexed with $La^{3+}$ to form complex anions and be adsorbed by the anion exchange resin. The adsorption is more uniform, and the system does not need to be heated to evaporate and concentrate. It may be loaded only by stirring, is easy to operate, saves energy and reduces consumption.

(2) In the present invention, the lanthanum uniformly adsorbed in the pores of the macroporous resin generates uniformly distributed lanthanum nanoparticles in situ under the condition of lye. When phosphorus is subsequently adsorbed, because the uniformly distributed nanoparticles show a larger specific surface area and adsorption space, the adsorption sites of lanthanum are increased, the diffusion of target pollutants in the pores is facilitated, and the uniformly distributed polymeric lanthanum nanocomposite shows a higher adsorption rate. In addition, compared with composites obtained by enabling lanthanum to enter the resin pores using a concentration method in the prior art, the polymeric lanthanum nanocomposite prepared by using the method of the present invention has a greatly improved adsorption rate during removal of phosphate.

(3) An evaporation concentration method often makes lanthanum chloride adhere to the surface of the resin, so that it is difficult to remove. After the precipitant is added, this part of lanthanum is converted to a precipitate and exists in the system, which not only causes a large loss of lanthanum, but also requires cleaning and separation of the resin and the precipitate. In the present invention, in the lanthanum loading process based on the principle of ion exchange, no excessive lanthanum adheres to the surface, no massive white lanthanum precipitate exists in the system in the precipitation process, the lanthanum is easy to separate, and the lanthanum utilization efficiency is improved.

(4) In the present invention, the above-mentioned method is adopted to prepare a polymeric lanthanum nanocomposite with nano-sized lanthanum oxide or nano-sized lanthanum carbonate hydrate uniformly distributed on the surface. This material shows a higher phosphorus adsorption capacity. When this polymeric lanthanum nanocomposite is repeatedly used to adsorb phosphorus, its adsorption rate can still be maintained at more than 90% of the first adsorption, proving that the polymeric lanthanum nanocomposite prepared by using this method has higher stability of loading the nano-lanthanum material.

(5) The method of the present invention can be used to implement continuous automatic synthesis operation by continuously supplementing lanthanum chloride to the system, which is beneficial to industrialized production.

DESCRIPTION OF EMBODIMENTS

The present invention will be further described below in conjunction with specific embodiments. A phosphorus solution used for adsorption is a phosphorus stock solution prepared from potassium dihydrogen phosphate.

Embodiment 1

A method for preparing a polymeric hydrated lanthanum oxide nanocomposite includes the following steps.

Figure 1:
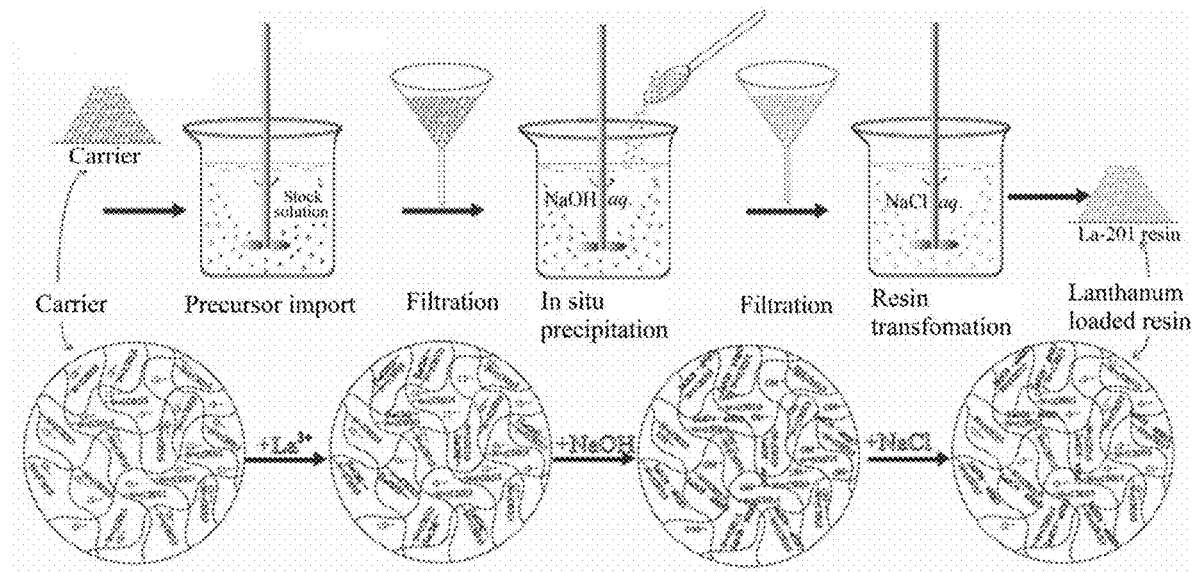
FIG. 1 is a flowchart illustrating a preparation method in Embodiment 1 of the present invention.

(1) As shown in FIG. 1, add concentrated hydrochloric acid with a concentration of 12 mol/L to ethanol to prepare a 1M HCl ethanol solution, dissolve 20 g of $LaCl_3$ in 200 mL of 1 M HCl ethanol solution, add 10 g of D-201 resin, and stir at 25° C. for 16 h.

(2) Filter out the resin to obtain a resin product A combined with lanthanum in an ion exchange manner.

(3) Add the product A to 200 mL of 15% NaOH, stir at 25° C. for 10 h, and filter out the resin to obtain a product B.

(4) Wash the product B until the product B is neutral, add 200 mL of 5% NaCl solution, stir for 4 h, filter out the resin, and dry the resin in an oven at 50° C. to obtain the polymeric lanthanum nanocomposite, i.e., the hydrated-lanthanum oxide-201 material.

Figure 2A:
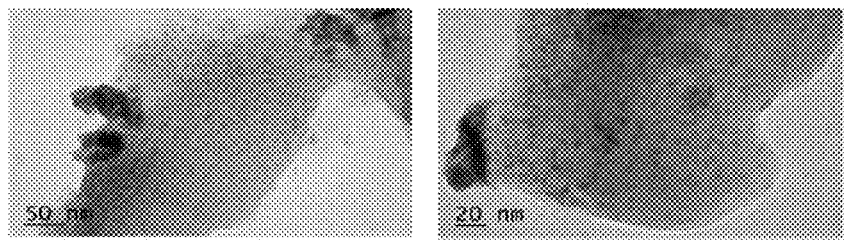
FIG. 2a is a TEM image illustrating the distribution of lanthanum oxide nanoparticles prepared in Embodiment 1 of the present invention in a macroporous resin carrier.
Figure 2B:
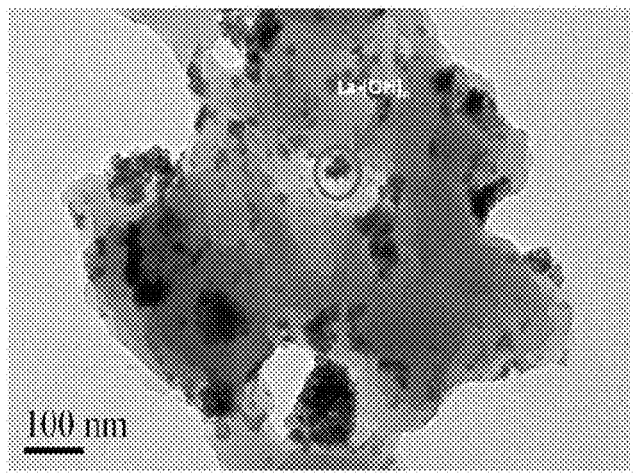
FIG. 2b is a TEM image illustrating the distribution of lanthanum oxide nanoparticles in a macroporous resin carrier, where the lanthanum oxide nanoparticles are prepared in Embodiment 4 according to a patent application No. CN 201910290333.5 in the prior art.
Figure 3A:
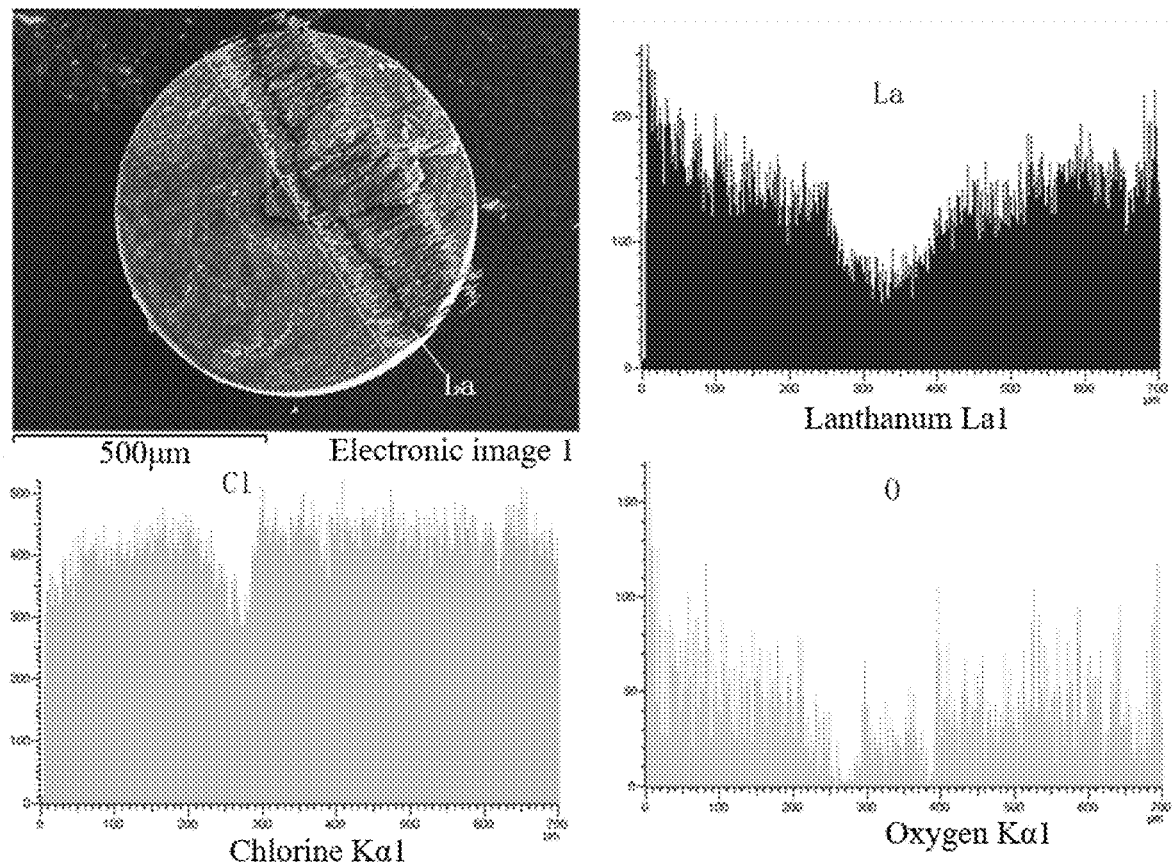
FIG. 3a is an SEM-EDS line scan diagram illustrating an element distribution of a polymeric lanthanum nanocomposite synthesized in Embodiment 1 of the present invention.
Figure 3B:
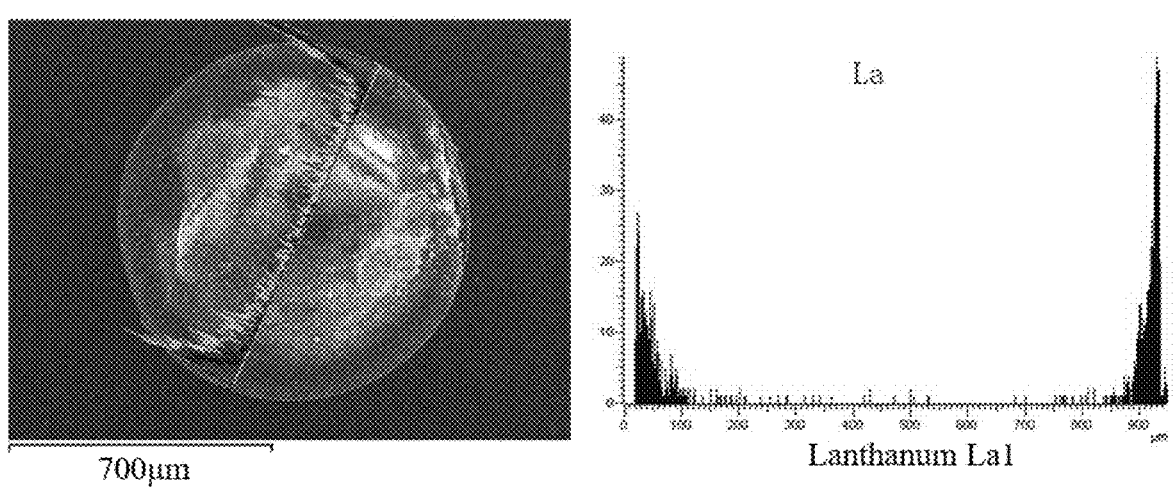
FIG. 3b is an SEM-EDS line scan diagram illustrating La element distribution on a cross-section of a nanocomposite synthesized in Embodiment 1 according to a patent application No. CN201910290333.5 in the prior art.
Figure 4:
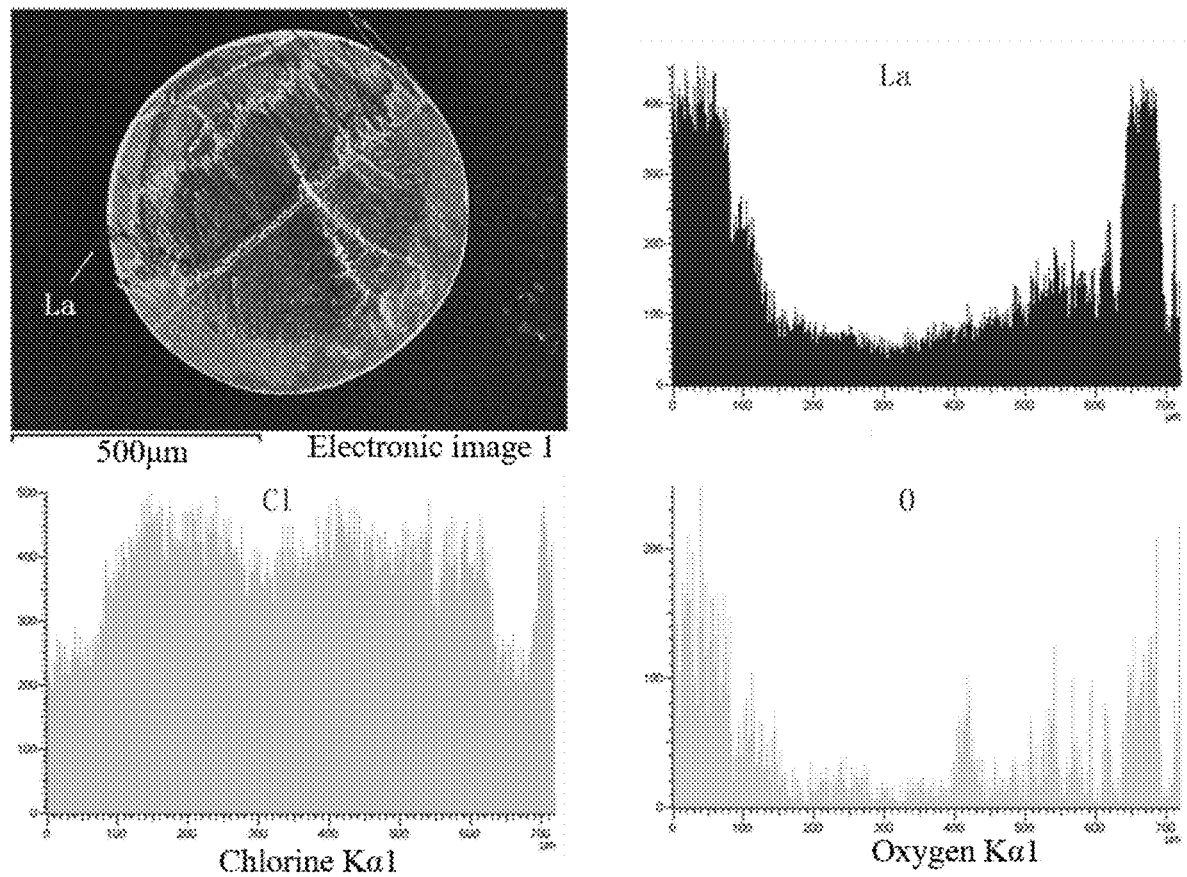
FIG. 4 is an SEM-EDS line scan diagram illustrating an element distribution of a nanocomposite La-201 synthesized on the basis of a method disclosed in Nanjing University graduation thesis *Basic research on the application of advanced phosphorus removal and phosphorus recovery from sewage based on nanocomposites;*
Figure 5:
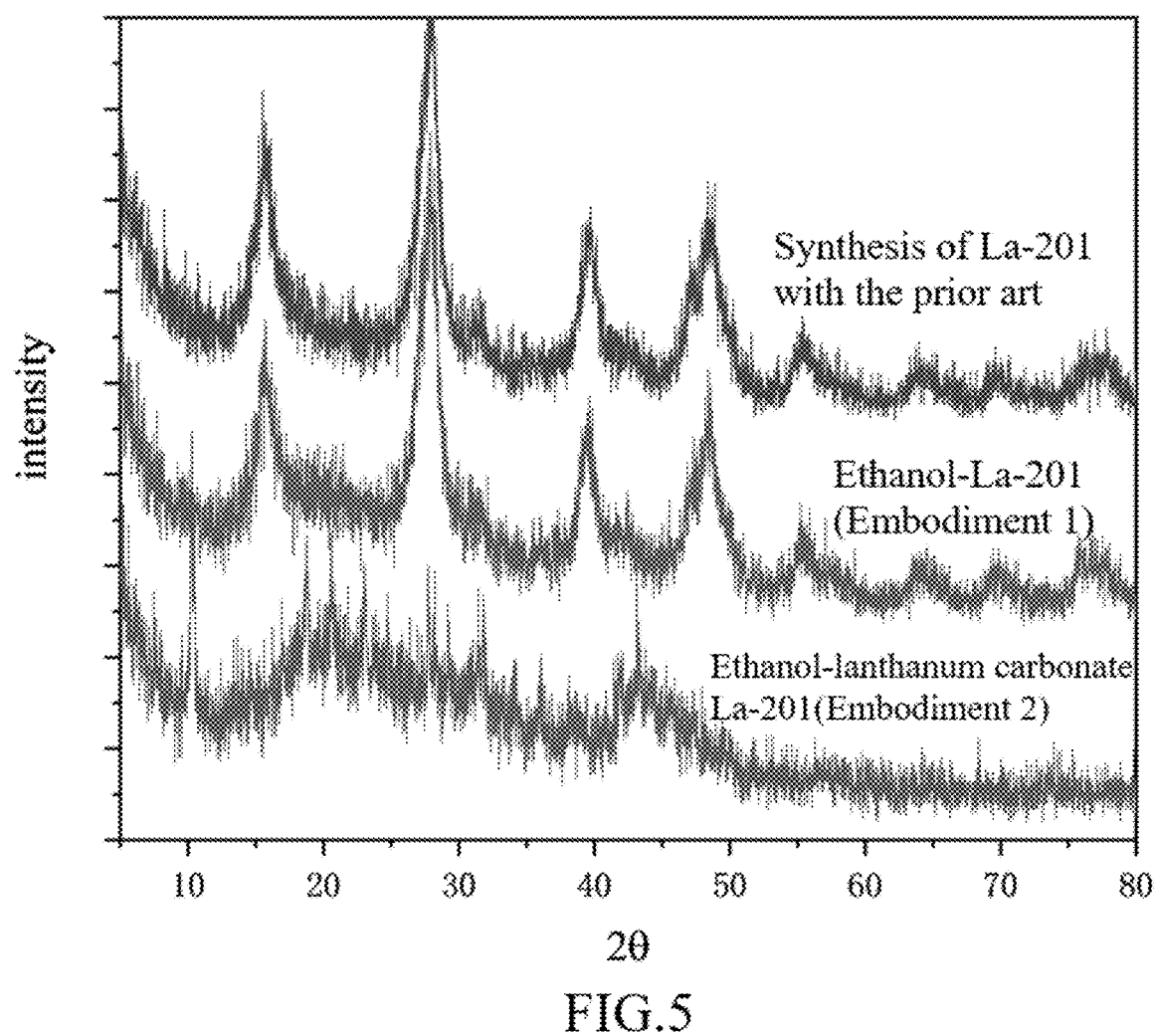
FIG. 5 shows XRD powder diffraction patterns of La-201 synthesized on the basis of a method disclosed in Nanjing University graduation thesis *Basic research on the application of advanced phosphorus removal and phosphorus recovery from sewage based on nanocomposites* and polymeric lanthanum nanocomposites prepared in Embodiment 1 and Embodiment 2 of the present invention.

The material prepared in this embodiment had a spherical shape with a diameter of 0.3-1.0 mm. As shown in FIG. 2a, the nanoparticle size was 10-100 nm, and after digestion, the lanthanum loading amount of the material was 22% measured by ICP; and the lanthanum is distributed in a carrier in the form of nanoparticles. As shown in FIG. 2a, the obtained material was sliced, and it was measured that the lanthanum element was uniformly distributed. Compared with a TEM image (see FIG. 2b) illustrating the distribution of lanthanum oxide nanoparticles in a macroporous resin carrier, where the lanthanum oxide nanoparticles are prepared in Embodiment 4 according to a patent application No. CN 201910290333.5 in the prior art, nanoparticles in this embodiment have a relatively small size and are distributed obviously more uniformly. Compared with an SEM-EDS line scan diagram illustrating Lanthanum oxide nanoparticles in a macroporous resin carrier (see FIG. 3b), where the Lanthanum oxide nanoparticles are prepared in Embodiment 4 according to the patent application No. CN 201910290333.5 in the prior art, and an SEM-EDS line scan diagram (FIG. 4) illustrating an element distribution of a nanocomposite La-201 synthesized on the basis of a method disclosed in Nanjing University graduation thesis Basic research on the application of advanced phosphorus removal and phosphorus recovery from sewage based on nanocomposites; as shown in FIG. 3a, an SEM-EDS line scan diagram illustrating an element distribution of a nanocomposite prepared using the method of this embodiment shows that in this embodiment, the dispersion uniformity of lanthanum nanoparticles was significantly enhanced. The sample was ground into powder for XRD test, and the results are shown in FIG. 5. It can be seen from analysis results that the nanoparticles obtained in this embodiment are most likely hydrated-lanthanum oxide.

Application of the above-mentioned polymeric hydrated lanthanum oxide nanocomposite in removal of phosphate from water includes the following steps.

(A) Add a hydrated lanthanum oxide-201 material into the water with a P content of 30 mg/L, and with a solid-liquid ratio of 0.5 g/L, adjust pH to 6-8, and react at room temperature for 24 h under stirring or oscillation.

(B) Take supernatant to detect a phosphorus concentration after adsorption.

(C) Wash the resin with ultrapure water for 5 times after adsorption, and filter and then dry the resin at 50° C.

Figure 6:
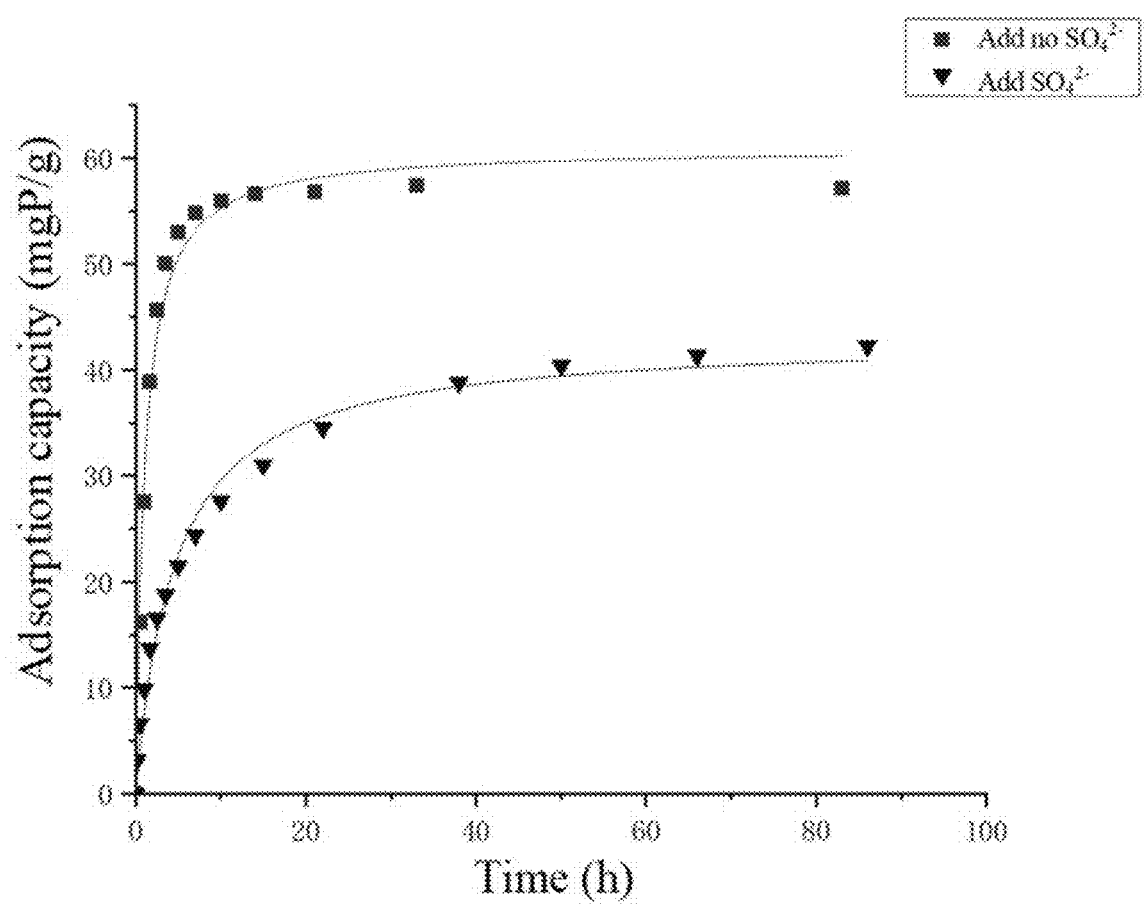
FIG. 6 shows adsorption capacities of a polymeric lanthanum nanocomposite prepared in Embodiment 1 of the present invention under different conditions.

As shown in FIG. 6, in the absence of competing ions $SO_4^{2-}$, the above-mentioned hydrated-lanthanum oxide-201 material may be used for adsorption and removal of phosphorus (initial concentration of 30 mg/L), and its adsorption capacity may reach nearly 60 mg/g, i.e., the phosphorus adsorption rate under this condition is close to 100%. The adsorption capacity may still reach 40 mg/g in the presence of competing ion $SO_4^{2-}$ (concentration of 500 mg/L), i.e., the phosphorus adsorption rate under this condition is about 80%.

The kinetics of phosphorus adsorption by hydrated-lanthanum oxide-201 prepared in this embodiment was studied. As shown in FIG. 6, obtained kinetic results were fitted by pseudo-second-order kinetic equations as follows:

In this embodiment, the phosphorus removal kinetics of the hydrated-lanthanum oxide-201 material in the absence of interfering ions is fitted to the second-order kinetic equation:

$$q = \frac{1}{0.0164 + \frac{1}{59.31t}} \quad (1)$$

In this embodiment, the phosphorus removal kinetics of the hydrated-lanthanum oxide-201 material in the presence of interfering ions is fitted to the second-order kinetic equation:

$$q = \frac{1}{0.0232 + \frac{1}{9.415t}} \quad (2)$$

Results showed that the hydrated-lanthanum oxide-201 material prepared in this embodiment could adsorb P up to an adsorption capacity of 56 mg/g in about 10 h (i.e., the P adsorption rate was about 93% under this condition), and the P concentration (based on the concentration of P in potassium dihydrogen phosphate) decreased from about 30 mg/L to about 1.4 mg/L when it reached equilibrium. Compared with corresponding results of lanthanum oxide nanoparticles prepared in Embodiment 4 according to the patent application No. 201910290333.5 in the prior art on a macroporous resin carrier, the kinetic results of phosphorus removal in this embodiment showed that the composite prepared in Embodiment 4 according to the patent application No. 201910290333.5 in the prior art substantially reached adsorption equilibrium in 60 h in the absence of sulfate interference ions. However, the hydrated-lanthanum oxide-201 material prepared in this embodiment substantially reached adsorption equilibrium within 10 h under the same conditions; and in the presence of sulfate interference ions, the hydrated-lanthanum oxide-201 material prepared in this embodiment reached adsorption equilibrium within 40 h.

10% NaOH was adopted to regenerate the hydrated-lanthanum oxide-201 material that had adsorbed phosphorus. A regeneration method includes the following steps.

(i) Add a resin into a mixed solution of 15% NaOH and 5% NaCl, with a solid-liquid ratio of 1 g/L, and react for 12 h under stirring or oscillation at 60° C.

(ii) Take supernatant to detect a phosphorus concentration after desorption.

(iii) Wash the resin with ultrapure water for 5 times after desorption, and filter and then dry the resin at 50° C., where the desorption rate may reach 97%.

The polymeric hydrated lanthanum oxide nanocomposite prepared in this embodiment was repeatedly used to adsorb phosphorus, and its adsorption rate could still be maintained at more than 90% of the first adsorption.

By adjusting the concentration of the HCl ethanol solution to change between 0.5 M and 1.5 M, and changing the stirring time in step (1) between 5 h and 24 h, the polymeric hydrated lanthanum oxide nanocomposite with a lanthanum loading rate of 8%-28% was obtained.

Embodiment 2

A method for preparing a polymeric hydrated lanthanum carbonate nanocomposite includes the following steps.

(1) Add concentrated hydrochloric acid with a concentration of 10 mol/L to ethanol to prepare a 1M HCl ethanol solution, dissolve 10 g of $LaCl_3$ in 200 mL of 1 M HCl ethanol solution, add 10 g of D-201 resin, and stir at 50° C. for 12 h.

(2) Filter out the resin to obtain a resin product A combined with lanthanum in an ion exchange manner.

(3) Add the product A to 200 mL of 2M $NH_4HCO_3$ solution, stir at 50° C. for 8 h, and filter out the resin to obtain a product B.

(4) Wash the product B until the product B is neutral, add 5% NaCl solution, stir for 4 h, filter out the resin, and dry the resin in an oven at 50° C. to obtain the polymeric lanthanum nanocomposite, i.e., the lanthanum carbonate hydrate-201 material.

The material prepared in this embodiment had a spherical shape with a diameter of 0.3-1.0 mm. After digestion, the lanthanum loading amount of the material was 15% measured by ICP. The obtained material was sliced, and it was measured that the lanthanum element was uniformly distributed. The samples were ground into powder for XRD test and analysis. As shown in FIG. 5, it can be seen from XRD diffraction peaks that the formed lanthanum nanoparticles are most likely lanthanum carbonate octahydrate.

Application of the above-mentioned polymeric hydrated lanthanum carbonate nanocomposite in removal of phosphate from water includes the following steps.

(A) Add a lanthanum carbonate hydrate-201 material into the water, with a solid-liquid ratio of 0.5 g/L, adjust pH to 6-8, and react at room temperature for 24 h or more under stirring or oscillation.

(B) Take supernatant to detect a phosphorus concentration after adsorption.

(C) Wash the resin with ultrapure water for 3 times after adsorption, and filter and then dry the resin at 50° C.

The lanthanum carbonate hydrate-201 material prepared in this embodiment was used for adsorption and removal of phosphorus (initial concentration of 10 mg/L), and its P adsorption capacity was nearly 20 mg/g (i.e., the P adsorption rate under this condition was close to 100%). The P adsorption capacity might still reach 15 mg/g under the action of competing ion $SO_4^{2-}$ (concentration of 500 mg/L) (i.e., the P adsorption rate under this condition was close to 75%).

The lanthanum carbonate hydrate-201 material prepared in this embodiment was used for adsorption and removal of phosphorus (initial concentration of 30 mg/L), and its P adsorption capacity might reach 57 mg/g (i.e., the P adsorption rate under this condition was close to 95%). The P adsorption capacity might still reach 40 mg/g under the action of competing ion $SO_4^{2-}$ (concentration of 500 mg/L) (i.e., the P adsorption rate under this condition was close to 67%).

15% NaOH was adopted to regenerate the lanthanum carbonate hydrate-201 material that had adsorbed phosphorus. A regeneration method includes the following steps.

(i) Add a resin into a mixed solution of 15% NaOH and 2% NaCl, with a solid-liquid ratio of 1 g/L, and react for 12 h under stirring or oscillation at 60° C.

(ii) Take supernatant to detect a phosphorus concentration after desorption.

(iii) Wash the resin with ultrapure water for 5 times after desorption, and filter and then dry the resin at 50° C., where the desorption rate may reach 90%.

The above-mentioned results show that the lanthanum carbonate hydrate-201 material prepared by using the method in this embodiment has the same characteristics of efficient phosphate removal as the hydrated-lanthanum oxide-201 material prepared in Embodiment 1.

By adjusting the concentration of the HCl ethanol solution to change between 0.5 M and 1.5 M, and changing the stirring time in step (1) between 5 h and 24 h, the polymeric hydrated lanthanum carbonate nanocomposite with a lanthanum loading rate of 11%-25% was obtained.

Embodiment 3

A method for preparing a polymeric hydrated lanthanum oxide nanocomposite includes the following steps.

(1) Add concentrated hydrochloric acid with a concentration of 11-12 mol/L to ethanol to prepare a 1M HCl ethanol solution, dissolve 5 g of $LaCl_3$ in 200 mL of 1M HCl ethanol solution, add 5 g of D-201 resin, and stir at 25° C. for 12 h.

(2) Filter out the resin to obtain a resin product A combined with lanthanum in an ion exchange manner.

(3) Add a small amount of product A to 200 mL of 10% NaOH solution for many times, stir at 25° C. for 8 h, and filter out the resin to obtain a product B.

(4) Wash the product B until the product B is neutral, add 5% NaCl solution, stir for 4 h, filter out the resin, and dry the resin in an oven at 50° C. to obtain the polymeric hydrated lanthanum oxide nanocomposite, i.e., the hydrated-lanthanum oxide-201 material.

The material prepared in this embodiment had a spherical shape with a diameter of 0.3-1.0 mm. After digestion, the lanthanum loading amount of the material was 18% measured by ICP. The obtained material was sliced, and it was measured that the lanthanum element was uniformly distributed. The samples were ground into powder for XRD test. The result analysis showed that it was most likely to be hydrated-lanthanum oxide.

Application of the above-mentioned polymeric hydrated lanthanum oxide nanocomposite in removal of phosphate from water includes the following steps.

(A) Add a hydrated-lanthanum oxide-201 material into the water, with a solid-liquid ratio of 0.5 g/L, adjust pH to 6-8, and react at room temperature for 24 h or more under stirring or oscillation.

(B) Take supernatant to detect a phosphorus concentration after adsorption.

(C) Wash the resin with ultrapure water for 5 times after adsorption, and filter and then dry the resin at 50° C.

In addition to the above application method, the hydrated-lanthanum oxide-201 material prepared in this embodiment might also be used in a dynamic adsorption and removal experiment of phosphorus (initial concentration of 2.5 mg/L), the adsorption capacity was 30 mg/g, and the volume of a treatment bed might reach 6000 BV. 10% NaOH was adopted to regenerate the lanthanum carbonate hydrate-201 material that had adsorbed phosphorus. A regeneration method includes the following steps.

(i) Add a resin into a mixed solution of 15% NaOH and 2% NaCl, with a solid-liquid ratio of 20 g/L, and react for 12 h under stirring or oscillation at 60° C.

(ii) Take supernatant to detect a phosphorus concentration after desorption.

(iii) Wash the resin with ultrapure water for 7 times after desorption, and filter and then dry the resin at 50° C., where the desorption rate may reach 98%.

The above-mentioned results indicate that the hydrated-lanthanum oxide-201 material synthesized by using the method of this embodiment may also be applied to fixed bed adsorption and has the potential for industrial application.

Embodiment 4

A method for preparing a polymeric hydrated lanthanum oxide nanocomposite includes the following steps.

(1) Add concentrated hydrochloric acid with a concentration of 12 mol/L to ethanol to prepare a 1M HCl ethanol solution, dissolve 20 g of $LaCl_3$ in 200 mL of 1M HCl ethanol solution, add 5 g of gel 201×7 resin, and stir at 25° C. for 12 h.

(2) Filter out the resin to obtain a resin product A combined with lanthanum in an ion exchange manner.

(3) Add a small amount of product A to 200 mL of 10% NaOH solution for many times, stir at 25° C. for 8 h, and filter out the resin to obtain a product B.

(4) Wash the product B until the product B is neutral, add 5% NaCl solution, stir for 4 h, filter out the resin, and dry the resin in an oven at 50° C. to obtain the polymeric lanthanum nanocomposite, i.e., a first hydrated-lanthanum oxide-gel 201 material, with a lanthanum loading amount of 12%.

COMPARATIVE EXAMPLE

A method for preparing a polymeric hydrated lanthanum oxide nanocomposite includes the following steps.

(1) Dissolve 20 g of $LaCl_3$ in 200 mL of ethanol solution (add no concentrated hydrochloric acid), add 5 g of gel 201×7 resin, and stir at 25° C. for 12 h.

(2) Filter out the resin to obtain a product A.

(3) Add a small amount of product A to 200 mL of 10% NaOH solution for many times, stir at 25° C. for 8 h, and filter out the resin to obtain a product B.

(4) Wash the product B until the product B is neutral, add 5% NaCl solution, stir for 4 h, filter out the resin, and dry the resin in an oven at 50° C. to obtain the polymeric hydrated lanthanum oxide nanocomposite, i.e., a second hydrated-lanthanum oxide-gel 201 material, with a lanthanum loading amount of 8%.

The first hydrated-lanthanum oxide-gel 201 material and the second hydrated-lanthanum oxide-gel 201 material obtained in Embodiment 4 and Comparative Example were compared. The difference in the preparation process was that the ethanol solution of lanthanum in Embodiment 4 contained hydrochloric acid with a 1M concentration, while the Comparative Example did not contain hydrochloric acid. Through the detection of phosphorus removal effects of the materials, it was found that the phosphorus removal performances of the first hydrated-lanthanum oxide-gel 201 material and the second hydrated-lanthanum oxide-gel 201 material were 56.8 mgP/g and 45.8 mgP/g respectively under the condition of no interfering ions, and were 33.4 mgP/g and 24.2 mgP/g in the presence of 500 mg/L $SO_4^{2-}$ interfering ions, respectively. During the preparation process, in the absence of hydrochloric acid, the phosphorus adsorption effect of the obtained second hydrated-lanthanum oxide-gel 201 material was reduced by about 20% (no competing ions) and 28% (competing ion $SO_4^{2-}$ concentration of 500 mg/L), respectively, proving that the addition of hydrochloric acid during the synthesis process has a greater impact on the phosphorus adsorption performance of the material.

Embodiment 5

A method for large-scale synthesis of a polymeric hydrated lanthanum oxide nanocomposite includes the following steps.

(1) Dissolve 10-15 kg of lanthanum chloride in 50-80 L of 1M HCl ethanol solution to obtain a raw material liquid, add 15-25 kg of D-201 resin to the raw material liquid, and stir for 12-24 h.

(2) Filter out the resin to obtain a resin product A combined with lanthanum in an ion exchange manner.

(3) Add the product A to 50-80 L of NaOH solution with 10%-15% of precipitant and stir for 6-10 h.

(4) Filter, wash, and dry to obtain a first batch of hydrated-lanthanum oxide-D-201 resin.

(5) Add 3-5 kg of lanthanum chloride and 0.5-1 L of 12M concentrated hydrochloric acid to the raw material liquid and dissolve, add 15-25 kg of D-201 resin to the raw material liquid, and stir for 12-24 h.

(6) Filter out the resin to obtain a product B.

(7) After supplementing 0.5-1 kg of NaOH to the precipitant solution, add the product B to the precipitant solution and stir for 6-10 h.

(8) Filter, wash, and dry to obtain a second batch of hydrated-lanthanum oxide-D-201 resin.

After testing, it was found that the phosphorus removal effects of the materials obtained in the two batches were basically the same, and both were higher than 50 mgP/g without interfering ions, which was not significantly different from results of a beaker experiment. In this embodiment, the raw material liquid was reused by the addition of lanthanum chloride and hydrochloric acid, the precipitant solution might also be reused by supplementing sodium hydroxide midway. This greatly reduces the cost of raw materials while ensuring product quality.

Embodiment 6

In step (1) in this embodiment, concentrated hydrochloric acid is added to an ethanol solution to form a 0.5M or 1.5M HCl ethanol solution, and after adding of the resin, stir for 24 h. Other conditions remain the same as those in Embodiment 3. The finally obtained polymeric lanthanum nanocomposite, a hydrated-lanthanum oxide-201 material, has a phosphorus removal effect equivalent to that of the material obtained in Embodiment 3.

Embodiment 7

In step (1) in this embodiment, concentrated hydrochloric acid is added to a methanol solution to form a 1 M HCl methanol solution. After adding of the resin, stir for 5 h. Other conditions remain the same as those in Embodiment 3. The finally obtained polymeric lanthanum nanocomposite, a hydrated-lanthanum oxide-201 material, had a phosphorus removal effect equivalent to that of the material obtained in Embodiment 3.

The above-mentioned implementation cases are only preferred implementation cases of the present invention, but the implementation of the present invention is not limited by the above-mentioned implementation cases. For example, various forms of combinations of the solutions in the embodiments, and any other changes, modifications, replacements, and combinations that do not depart from the spirit and principle of the present invention are equivalent replacement manners, and shall all fall within the protection scope of the present invention.

What is claimed is:

1. A method for preparing a polymeric lanthanum nanocomposite, comprising the following steps:
   (1) mixing lanthanum chloride heptahydrate with concentrated hydrochloric acid and dissolving the mixture in alcohol, adding a resin, and stirring at room temperature;
   (2) draining the resin after the stirring in step (1) for use;
   (3) adding the resin obtained in step (2) to a precipitant solution, and stirring at room temperature and then filtering out the resin; and
   (4) washing the resin obtained in step (3) with water until the resin is neutral, adding a NaCl solution, stirring and then filtering out the resin, and drying to obtain the polymeric lanthanum nanocomposite.

2. The method for preparing a polymeric lanthanum nanocomposite according to claim 1, wherein in step (1), the concentrated hydrochloric acid solution has a concentration of 10-12 mol/L, and a concentration of the concentrated hydrochloric acid in the alcohol is 0.5-1.5 mol/L.

3. The method for preparing a polymeric lanthanum nanocomposite according to claim 2, wherein in step (1), the alcohol is methanol or ethanol.

4. The method for preparing a polymeric lanthanum nanocomposite according to claim 3, wherein in step (1), the stirring is performed for 5-24 h.

5. The method for preparing a polymeric lanthanum nanocomposite according to claim 4, wherein in step (1), the resin is a strong basic anion exchange resin having a styrene-divinylbenzene matrix and ammonium ion functional groups.

6. The method for preparing a polymeric lanthanum nanocomposite according to claim 5, wherein in step (3), the precipitant solution is one or more selected from the group consisting of sodium hydroxide, sodium carbonate, sodium bicarbonate, ammonium carbonate or ammonium bicarbonate.

7. A polymeric hydrated lanthanum oxide nanocomposite obtained by using the preparation method according to claim 1, wherein the polymeric hydrated lanthanum oxide nanocomposite has a diameter of 0.3-1.0 mm, nano-sized hydrated-lanthanum oxide particles have a size of 10-100 nm, and a loading amount of lanthanum in the polymeric hydrated lanthanum oxide nanocomposite is 8%-28%.

8. A method for applying the polymeric hydrated lanthanum oxide nanocomposite according to claim 7 to remove phosphate from water comprising the following steps:
(A) adding the polymeric hydrated lanthanum oxide nanocomposite into the water, adjusting a pH in a range of 6-8, and reacting for 24 hours or more at room temperature under stirring or oscillation;
(B) taking supernatant to detect a phosphorus concentration after adsorption; and
(C) washing the polymeric hydrated lanthanum oxide nanocomposite with water after adsorption, and filtering and then drying the polymeric hydrated lanthanum oxide nanocomposite.

9. The method according to claim 8, further comprising regenerating the polymeric hydrated lanthanum oxide nanocomposite after phosphorus adsorption by performing the following steps:
(i) adding the polymeric hydrated lanthanum oxide nanocomposite into a mixed solution of NaOH and NaCl, with a solid-liquid ratio of 1-20 g/L, and reacting for a certain period of time under heating and stirring or oscillation;
(ii) taking supernatant to detect a phosphorus concentration after desorption; and
(iii) washing the polymeric hydrated lanthanum oxide nanocomposite with water after desorption, and filtering and then drying the polymeric hydrated lanthanum oxide nanocomposite.

10. A polymeric hydrated lanthanum carbonate nanocomposite obtained by using the preparation method according to claim 1, wherein the polymeric hydrated lanthanum carbonate nanocomposite has a diameter of 0.3-1.0 mm, nano-sized lanthanum carbonate hydrate particles have a size of 20-120 nm, and a loading amount of lanthanum in the polymeric hydrated lanthanum carbonate nanocomposite is 11%-25%.

11. A method for applying the polymeric hydrated lanthanum carbonate nanocomposite according to claim 10 to remove phosphate from water comprising the following steps:
(A) adding the polymeric hydrated lanthanum carbonate nanocomposite into the water, adjusting a pH in a range of 6-8, and reacting for 24 hours or more at room temperature under stirring or oscillation;
(B) taking supernatant to detect a phosphorus concentration after adsorption; and
(C) washing the polymeric hydrated lanthanum carbonate nanocomposite with ultrapure water after adsorption, and filtering and then drying the polymeric hydrated lanthanum carbonate nanocomposite.

12. The method according to claim 11, further comprising regenerating the polymeric hydrated lanthanum carbonate nanocomposite after phosphorus adsorption by performing the following steps:
(i) adding the polymeric hydrated lanthanum carbonate nanocomposite into a mixed solution of NaOH and NaCl, with a solid-liquid ratio of 1-20 g/L, and reacting for a certain period of time under heating and stirring or oscillation;
(ii) taking supernatant to detect a phosphorus concentration after desorption; and
(iii) washing the polymeric hydrated lanthanum carbonate nanocomposite with water after desorption, and filtering and then drying the polymeric hydrated lanthanum carbonate nanocomposite.

* * * * *